April 19, 1949.                G. A. ALEXIADIS                2,467,418
                                ANTISKID TIRE
                             Filed April 21, 1948

INVENTOR.
GEORGE ALEXANDER ALEXIADIS
BY
ATTORNEY

Patented Apr. 19, 1949

2,467,418

UNITED STATES PATENT OFFICE 2,467,418

ANTISKID TIRE

George Alexander Alexiadis, Brookline, Mass.

Application April 21, 1948, Serial No. 22,311

4 Claims. (Cl. 152—210)

This invention relates to new and useful improvements in anti-skid tires.

Many attempts have been made to construct practical anti-skid tires, but each embodied numerous inherent deficiencies which prevented their commercial adaptation. In some tires detachable and replaceable studs were used upon the tread but such studs became worn very rapidly and it was a difficult matter to replace worn studs with new studs because the recesses in the tire tread were also partially worn. It would require great skill to do the job and a majority of automobile drivers could not possibly do it. Moreover, replacing a large number of studs requires several hours of work.

Attempts have also been made to embed various metal cables and other objects in the treads of tires but each of these proved unsatisfactory in that in a short period of time they wore down and became smooth and offered no anti-skid effect. Attempts were made to use cement filled studs but these had little or no value in that the cement soon crushed into powder after but a few miles of operation, and then the construction only served to weaken the tread without any anti-skid protection. Moreover, the remnants of broken and crushed studs then comprised merely elements of destruction of the tire and its fabric layers. Most of these constructions added considerable weight to the tire and reduced its elasticity.

In other tires attempts were made to bond particles of abrasive into the tread with brass or latex. However, these particles were of haphazard irregular shapes and scattered independently through the tread of the tire and had no substantial support. After the tire was used but a short time the abrasive particles would peel out from the surface of the tread and leave objectionable cavities. Friction on the road would split the particles into smaller particles and so readily dislocate them. Moreover, the particles usually were of hard brittle substances which wore out sooner than the rubber of the face of the tread.

In spite of the various attempts made to construct anti-skid tires skid chains have been and still are being generally used. Such chains are highly unsatisfactory in many respects. They are difficult to apply and remove from the tires. They wear out rapidly and break in one or more places. In fact busy cars such as taxicabs are capable of wearing out a pair of chains in three days time. Very frequently the chains do not act to prevent or stop a skid. Despite these objectionable features, chains have proved to be more practical than the heretofore attempted constructions of anti-skid tires.

The dominating feature of this invention resides in the construction of an anti-skid tire which is exceptionally durable and effective in operation. It is proposed to so construct the new tire that there is no need of mounting on or taking off any parts when road conditions change from dry roads to ice and snow, or vice versa.

Another and important object of this invention is to incorporate in the tread of the tire emery lumps fashioned and mounted within the tread so as to effectively act as an anti-skid agent and maintain their positions in the tire in a permanent manner. It is proposed that the emery lumps be encased in a thin metal sheet casing or other construction arranged at regular or irregular positions upon the tread of a tire at a great many points and places. It is proposed that the emery lumps be pure emery or a mixture with other suitable ingredients. The emery may be fine grain or coarse and irregular grain, though the latter is recommended, preferably the size to be that of lentil or slightly larger.

Another and important object of this invention resides in so fashioning the emery lumps and the casings which house the lumps, that these parts are of substantially frusto-conical shapes embedded in the vulcanized rubber tread of the tire with their small ends in the face of the tread and their large ends deep in the tread. It is further proposed to provide the inner ends of the casings of the emery lumps with spaced arms extending inwards of their large ends, and anchorage discs mounted across the arms in order that the rubber material of the tread extends in between the arms and between the large ends of the casings and the discs. With this construction the discs hold the casings from moving in all directions, namely, inwards and outwards and angularly. The casings themselves are firmly held from moving laterally. During the wearing down of the tire tread and the wearing down of the casings and the emery lumps, the casings and emery lumps can never be displaced from the tread because the remaining parts are always larger than the parts at the face of the tread of the tire. In addition they are always permanently embedded in place.

Not only will the new tire be anti-skid on snow and ice but it will also have a better traction on dry roads. When brakes are applied on a car fitted with the tires the car will be brought to a quicker stop in a shorter distance because the tires will better grip the road than tires presently in use. This is also true when the tires are used on ice and snow. The emery particles will set up such frictional resistance on ice and snow as to bring the car to a quicker stop in a shorter distance. In this respect the new tires are far superior to the present day chains.

It is contemplated that this invention be used on new tires, or that demountable tread coverings embodying the invention be provided for old tires already manufactured without the advantages of this invention.

Another object of the invention is the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 2:
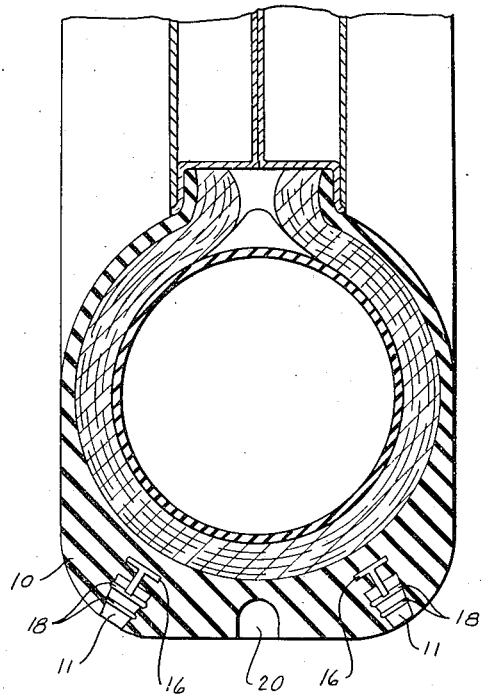
Fig. 2 is a fragmentary radial sectional view of the wheel shown in Fig. 1, this section being taken on the line 2—2 thereof.

The new anti-skid tire, in accordance with this invention, is provided with the usual rubber tread 10, (or with a rubber tread member mountable on the usual rubber tread of a present day tire). The rubber tread 10 is provided with a plurality of frusto-conical hollow casings 11 embedded in the rubber tread during the vulcanization thereof. These casings 11 have their small diameter ends 12 open and disposed in the face of the tread 10. The large diameter ends 13 are closed and disposed deep in the tread. Abrasive material such as emery 14 is packed in and fills the casings 11 and is suitably bonded in position with melted tin (Sn) or other soft metal.

Figure 3:
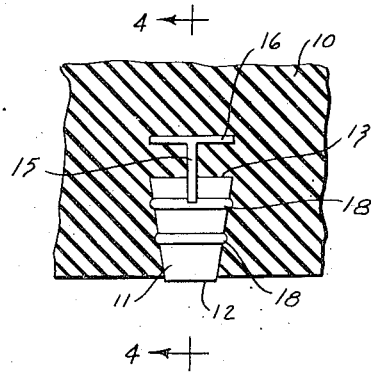
Fig. 3 is a fragmentary enlarged detailed view of a portion of Fig. 2.
Figure 4:
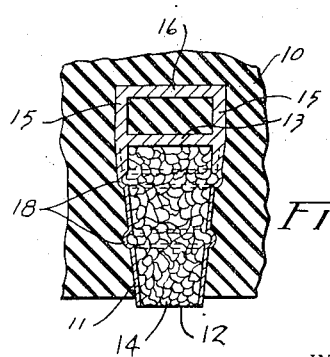
Fig. 4 is an enlarged sectional view taken on the line 4—4 of Fig. 3.

Each of the casings 11 is provided with spaced arms 15 on their sides and extending inwards of the large ends 13 thereof. A disc 16 is mounted between the arms 15 of each of the casings 11 in order that the rubber material of the tread 10 extends in between the arms 15 and in between the large end of the casing 11 and the disc 16 of each casing 11, as clearly illustrated in Figs. 3 and 4.

It is proposed that the casings 11 be of metal, though other durable materials would be just as satisfactory. It is proposed that the emery 14 be initially produced in lumps of the size of lentils, or slightly larger. Then the emery is packed in and securely bonded in said casings 11 with melted tin or other soft metal and allowed to harden. It is furthermore proposed that the casings 11 be provided with lateral projections 18, such as beads, on their sides for engaging into the rubber material of the tire tread 10 to further and more securely hold the casings in position. Moreover, it is proposed that the casings 11 be bonded in position during the vulcanization of the tire.

Figure 1:
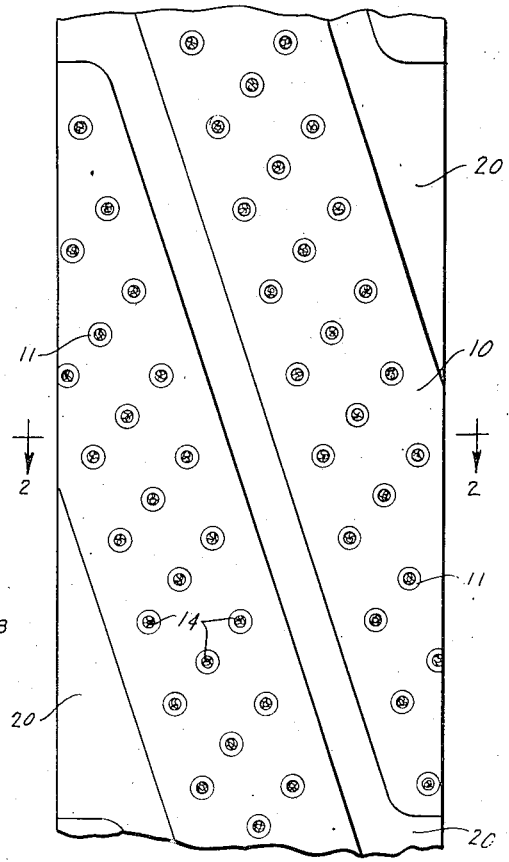
Fig. 1 is a fragmentary edge view of a section of a wheel provided with a tire constructed in accordance with this invention.

The casings 11 with the emery 14 are arranged at spaced positions throughout the tread 10 of the tire. They may be arranged in uniform designs or any other arrangement. Fig. 1 shows one of these designs. It is further proposed that the tread 10 of the tire be provided with grooves 20 extending annularly across the tread so as to act as a multiple screw during the rotation of the tire to force ice and snow to one side of the wheel. These grooves 20 also add to the traction of the tire.

The operation and use of the invention may be better understood from the following.

The emery masses 14 are permanently mounted in the tread of the tire. They cannot peel out because their inner ends are larger than their outer ends. Moreover the casings 11 in which the emery 14 is mounted is securely anchored by the fact that the material of the tread 10 engages in between the arms 15 and in between the discs 16 and the closed ends 13 of the casings. The discs 16 serve to firmly hold the casings 11 from coming out and also restrain the casings from wobbling. During operation of the tire the casings 11 and the emery 14 will wear down later than the tread. But at all times during traction the emery will be substantially flush with the face of the tread and the road so as to act upon the road or ice and snow on the road. The traction of the tire is materially increased which serves as anti-skidding, and further serves to better grip the ground for starting and stopping and during driving upon roads in various conditions.

Additional advantages of the new tire have already been stated in the objects.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. An anti-skid tire having a vulcanized rubber tread, and a plurality of frusto-conical hollow casings embedded in said vulcanized rubber tread with their small ends open and in the face of said tread and their large ends closed and deep in said tread, an emery abrasive material filling said casings, spaced arms on the sides of each of said casings and extending inwards of the large end of the casing, and a disc mounted between the arms of each casing in order that the rubber material of said tread extends between said arms and between the large end of the casing and said disc.

2. An anti-skid tire having a vulcanized rubber tread, and a plurality of frusto-conical hollow casings embedded in said vulcanized rubber tread with their small ends open and in the face of said tread and their large ends closed and deep in said tread, an emery abrasive material filling said casings, spaced arms on the sides of each of said casings and extending inwards of the large end of the casing, and a disc mounted between the arms of each casing in order that the rubber material of said tread extends between said arms and between the large end of the casing and said disc, said hollow casings being of metal and said emery abrasive material being bonded in position with soft metal.

3. An anti-skid tire having a vulcanized rubber tread, and a plurality of frusto-conical hollow casings embedded in said vulcanized rubber tread with their small ends open and in the face of said tread and their large ends closed and deep in said tread, an emery abrasive material filling said casings, spaced arms on the sides of each of said casings and extending inwards of the large end of the casing, a disc mounted between the arms of each casing in order that the rubber material of said tread extends between said arms and between the large end of the casing and said disc, and projections on the sides of said casings engaging into the rubber material of said tread.

4. An anti-skid tire having a vulcanized rubber tread, and a plurality of frusto-conical hollow casings embedded in said vulcanized rubber tread with their small ends open and in the face of said tread and their large ends closed and deep in said tread, an emery abrasive material filling said casings, spaced arms on the sides of each of said casings and extending inwards of the large end of the casing, a disc mounted between the arms of each casing in order that the rubber material of said tread extends between said arms and between the large end of the casing and said disc, and projections on the sides of said casings engaging into the rubber material of said tread, and said tread having grooves extending angularly across the tread.

GEORGE ALEXANDER ALEXIADIS.

REFERENCES CITED

The following references are of record in the file of this patent:

UNITED STATES PATENTS

| Number | Name | Date |
|---|---|---|
| 1,435,566 | Wanderly et al. | Nov. 14, 1922 |

FOREIGN PATENTS

| Number | Country | Date |
|---|---|---|
| 355,660 | France | Nov. 9, 1905 |